United States Patent
Van Druff et al.

(10) Patent No.: US 7,722,081 B2
(45) Date of Patent: May 25, 2010

(54) COMBAT VEHICLE RESTRAINT SYSTEM

(75) Inventors: Charles E. Van Druff, Laguna Hills, CA (US); John Churilla, Riverside, CA (US); Eric Kawabata, Orange, CA (US)

(73) Assignee: Conax Florida Corporation, St. Petersburg, FL (US)

( * ) Notice: Subject to any disclaimer, the term of this patent is extended or adjusted under 35 U.S.C. 154(b) by 931 days.

(21) Appl. No.: 11/417,734

(22) Filed: May 4, 2006

(65) Prior Publication Data
US 2007/0257480 A1 Nov. 8, 2007

(51) Int. Cl.
*B60R 22/20* (2006.01)
*B60R 22/34* (2006.01)

(52) U.S. Cl. .......... 280/801.2; 280/801.1; 280/806; 280/808; 297/468; 24/579.11

(58) Field of Classification Search ............ 24/187, 24/197, 200, 579.11; 280/801.1, 801.2, 806–808; 297/468, 470, 478, 480, 483
See application file for complete search history.

(56) References Cited

U.S. PATENT DOCUMENTS

| | | | | |
|---|---|---|---|---|
| 3,233,941 A | * | 2/1966 | Selzer | .......... 297/483 |
| 4,239,260 A | | 12/1980 | Hollowell | |
| 4,487,454 A | * | 12/1984 | Biller | .......... 297/468 |
| 4,640,550 A | | 2/1987 | Hakansson | |
| 4,742,604 A | * | 5/1988 | Mazelsky | .......... 24/579.09 |
| 4,758,048 A | * | 7/1988 | Shuman | .......... 297/468 |
| 4,790,597 A | | 12/1988 | Bauer et al. | |
| 4,940,254 A | | 7/1990 | Ueno | |
| 5,219,206 A | * | 6/1993 | Anthony et al. | .......... 297/473 |
| 5,236,220 A | * | 8/1993 | Mills | .......... 280/801.1 |
| 5,248,187 A | * | 9/1993 | Harrison | .......... 297/482 |
| 5,282,672 A | | 2/1994 | Borlinghaus | |
| 5,403,038 A | * | 4/1995 | McFalls | .......... 280/808 |
| 5,570,933 A | * | 11/1996 | Rouhana et al. | .......... 297/483 |
| 5,634,664 A | * | 6/1997 | Seki et al. | .......... 280/806 |
| 5,788,282 A | * | 8/1998 | Lewis | .......... 280/808 |
| 6,056,320 A | | 5/2000 | Khalifa | |
| 6,343,841 B1 | * | 2/2002 | Gregg et al. | .......... 297/468 |
| 6,367,882 B1 | * | 4/2002 | Van Druff et al. | .......... 297/484 |

(Continued)

FOREIGN PATENT DOCUMENTS

DE 4019402 A1 * 12/1991

(Continued)

*Primary Examiner*—Faye M. Fleming
*Assistant Examiner*—Laura Freedman
(74) *Attorney, Agent, or Firm*—GrayRobinson, P.A.

(57) ABSTRACT

A combat vehicle restraint system accommodates a wide range of soldiers, both with and without battle, arctic, or chemical gear. The restraint system includes lengthened belts and an adjustable buckle position. The belts include loops for locating and grasping the belts, and separate lap and shoulder belts with small narrowing ends to prevent catching on gear. The belts are extendable from Inertial reels which are calibrated for off-road operation. The buckle engages each belt separately and includes a single action release. The buckle position is easily adjusted using an oversized knob so that a soldier may easily find and adjust buckle length in the dark, wearing heavy gloves, or with muddy slippery fingers. The latch/unlatch mechanism and associated hardware is an open frame type to reduce or eliminate affects of mud, dust, water or other contaminants on operation.

6 Claims, 5 Drawing Sheets

U.S. PATENT DOCUMENTS

| | | | |
|---|---|---|---|
| 6,467,849 B1 | 10/2002 | Deptolla | |
| 6,520,392 B2* | 2/2003 | Thibodeau et al. | 224/275 |
| 6,719,326 B2* | 4/2004 | Schroth et al. | 280/801.1 |
| 6,851,160 B2* | 2/2005 | Carver | 24/197 |
| 6,871,876 B2* | 3/2005 | Xu | 280/801.1 |
| 7,407,193 B2* | 8/2008 | Yamaguchi et al. | 280/805 |
| 2004/0217583 A1* | 11/2004 | Wang | 280/805 |
| 2005/0017567 A1 | 1/2005 | Sachs et al. | |
| 2006/0267394 A1* | 11/2006 | David et al. | 297/468 |
| 2008/0018156 A1* | 1/2008 | Hammarskjold et al. | 297/354.1 |
| 2008/0054615 A1* | 3/2008 | Coultrup | 280/801.1 |

FOREIGN PATENT DOCUMENTS

| | | |
|---|---|---|
| GB | 2356890 A * | 6/2001 |

* cited by examiner

COMBAT VEHICLE RESTRAINT SYSTEM

BACKGROUND OF THE INVENTION

The present invention relates to occupant restraint systems for vehicles used in combat zones and in particular to a seat harness providing ease of use and improved occupant protection.

From 1985 to the present, a standard automotive style 3-point restraint system (i.e., harness) with a push button release buckle has been supplied in military Humvee vehicles. This harness has resulted in numerous safety problems because it was not designed for the unique requirements of soldiers in combat situations A recent solicitation from the government to improve occupant safety and usage included many requirements. One of the top requirements was to fit a wide range of soldiers both with and without battle gear. Battle gear is equipment worn by the soldier when in hostile situations. The gear includes personal armor, a vest for carrying equipment, a backpack, a water container (Camel Back) and numerous other types of additional equipment. A result of wearing battle gear is that the soldier sits further forward in the seat than normal.

The standard automotive style 3-point harness presently used connects to fixed vehicle attachment points. Unfortunately, such fixed points are in relation to the seat, not necessarily to the occupant, and may not be easy to use or provide the desired occupant protection. For example, the buckle position affects vehicle ingress and rapid emergency egress, and affects effective harness operation in the event of an accident. As a result, the known fixed buckle position may result in difficulty in using the harness and therefore may not be used, and when used may fail to protect an occupant from injury in the event of an accident.

BRIEF SUMMARY OF THE INVENTION

The present invention addresses the above and other needs by providing a combat vehicle restraint system which accommodates a wide range of soldiers, both with and without battle, arctic, or chemical gear. The restraint system includes lengthened belts and an adjustable buckle position. The belts include loops for locating and grasping the belts, and separate lap and shoulder belts with small narrowing ends to prevent catching on gear. The belts are extendable from inertial reels which are calibrated for off-road operation. The buckle engages each belt separately and includes a single action release. The buckle position is easily adjusted using an oversized knob so that a soldier may easily find and adjust buckle length in the dark, wearing heavy gloves or with muddy slippery fingers. The adjustment is a positive position stop type which allows the wearer to easily verify the buckle position. The latch/unlatch mechanism and associated hardware is an open frame type to reduce or eliminate affects of mud, dust, water or other contaminants on operation.

In accordance with one aspect of the invention, there is provided a restraint system for combat vehicles. The restraint system includes a shoulder inertial reel and a belt extendable from the shoulder inertial reel and having a shoulder belt connector, a lap inertial reel and a lap belt extendable from the lap inertial reel and having a lap belt connector, a buckle mount connected to a vehicle, a buckle adjuster connected to the buckle mount, and a buckle connected to the buckle adjuster. The buckle adjuster is adjustable in length, to adjust the position of the buckle. The buckle has two connection latches wherein each connection latch independently accepts a respective one of the belts.

In accordance with an additional aspect of the invention, there is provided a restraint system for combat vehicles. The restraint system includes a shoulder belt extendable from a shoulder inertial reel and having a shoulder belt connector, a lap belt extendable from a lap inertial reel and having a lap belt connector, a buckle mount connected to a vehicle, a buckle adjuster connected to the buckle mount, and a buckle connected to the buckle adjuster. The buckle adjuster includes an arm, a latching mechanism, and a longitudinal slide. The arm has a mount end and a latch end, and the mount end is attached to the mount. The latching mechanism is fixedly attached to the latch end of the arm. The longitudinal slide has a stop end and a buckle end and at least two longitudinally spaced apart latching features for cooperation with the latching mechanism to latch the slide in one of at least two longitudinal positions. The buckle is connected to the buckle end of the longitudinal slide and receives the belts.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1A:
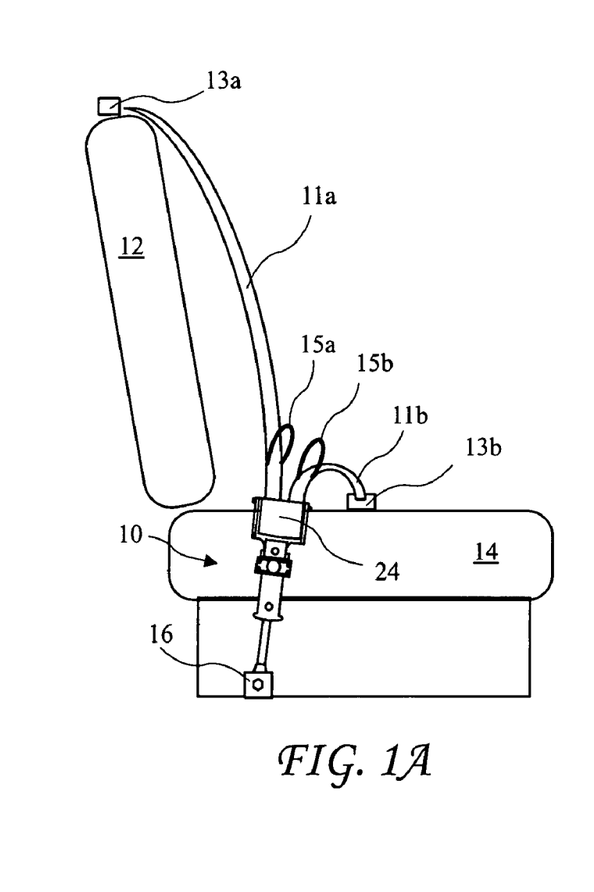
FIG. 1A is a vehicle seat and a restraint system according to the present invention in a lowered position.
Figure 1B:
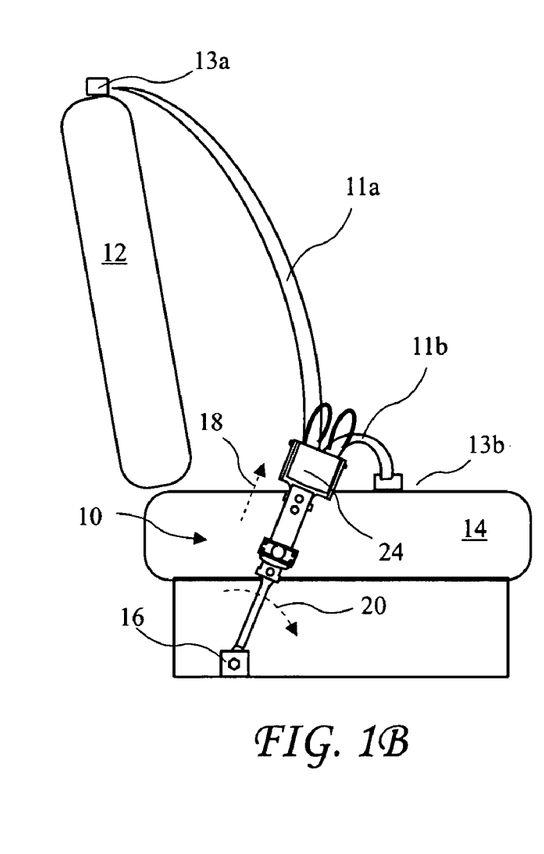
FIG. 1B is the vehicle seat and the restraint system according to the present invention in a raised position.

A restraint system according to the present invention is shown adjusted to a first position for a small soldier without gear in FIG. 1A, and adjusted to a second position for a large soldier wearing substantial gear in FIG. 1B. The restraint system may further be adjusted to intermediate positions. Soldiers often wear (or carry) gear such as backpacks, body armor, guns, canteens radios and maps. Soldiers may further wear arctic gear or chemical gear, both of which may substantially add to the overall girth of the soldier. Soldiers wearing such gear may be hampered by thick multiple layer gloves and experience constrained body movements. The restraint system according to the present invention is designed to ease both ingress (buckling up) and egress from a combat vehicle, and in particular to facilitate ingress and egress in a hostile environment, while safely securing a soldier when the vehicle is underway.

An adjustable buckle assembly 10 according to the present invention is shown in a lowered (or retracted) position attached to a mount 16 in FIG. 1A, and the buckle adjuster 10 is shown in a raised (or extended) position in FIG. 1B. The buckle adjuster 10 is positioned on the side of a vehicle seat comprising a seat back 12 and a seat bottom 14. The buckle adjuster 10 may be extended as shown by arrow 18 between approximately 2.5 inches and between approximately seven inches, and preferably may be extended approximately 2.5 inches. The buckle adjuster 10 may be rotated in the mount 16 approximately 30 degrees as shown by arc 20. The restraint system is thereby able to accommodate small female soldiers by moving the buckle to a rear position to insure a snug fit to restrain small stature individuals and the buckle may be adjusted forward for a soldier wearing substantial battle gear.

A large easy to operate buckle 24 is connected to the adjustable buckle assembly 10. The buckle 24 which is preferably a dual buckle which independently accepts a shoulder belt 11a and a separate lap belt 11b. Troops wearing full battle, arctic & chemical gear may be hampered by thick multiple layer gloves and constrained body movements. The large easy to operate buckle 24 facilitates both ingress (buckling up) and egress.

Figure 9A:
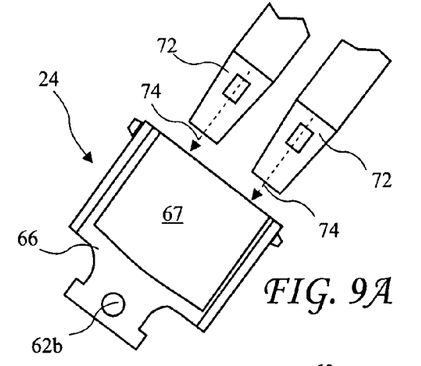
FIG. 9A is a buckle suitable for use with the present invention.

The belts 11a and 11b are preferably very long straps to accommodate large soldiers wearing substantial equipment such as backpacks, body armor, guns, canteens radios and maps, and may be up to approximately 80 inches long. Grabs 15a and 15b are attached to the belts 11a and 11b respectively. The grabs 15a, 15b allow a soldier to more easily locate and grasp the belts 11a and 11b in a dark or smokey environment and allow gloved occupants the ability to handle the belts 11a and 11b day or night. Each of the belts 11a and 11b include separate connectors 72 (see FIG. 9A) which are small and narrow so the belts don't catch on military gear to slow the occupant's exit from the vehicle. The separate connectors 72 do not create a loop to catch on the occupant's arm or gear during vehicle exit.

The belts 11a and 11b pay out from reels 13a and 13b respectively which are preferably locking inertial reels which lock during a crash event. Further, the shoulder belt reel 13a and the lap belt reel 13b are more preferably latching inertial reels which latches in the presence of specified accelerations and remains latched until released. Such latching inertial reel is described in U.S. patent application Ser. No. 11/378,578 filed Mar. 17, 2006 and assigned to the assignee of the present application. The reels 13a and 13b most preferably latch and remain latched in the presence of a large vertical acceleration.

The shoulder inertial reel 13a preferably has a special high locking calibration to allow for comfortable off road and on road operation. The calibration of the shoulder inertial reel 13a is preferably set to approximately 0.85 G (instead of the typical 0.3 G to 0.7 G for normal restraints) for momentary locking to allow freedom of movement during off road operations. The reel 13a remains momentarily locked until the sensed acceleration drops below the calibration level. Additionally, the unlocking preferably requires that the Vehicle must be level plus or minus approximately 20 degrees (stays locked in roll over) and that the load on the retractor strap must be zero (occupant not applying load to the seatbelt). In some instances, the shoulder reel 13a may be a latching reel which remains locked following a high sensed acceleration, until manually un-locked. A typical inertial reel may lock during normal off-road driving, thereby unnecessarily restraining an occupant to their seat. Such a locked shoulder inertial reel would not allow leaning forward to operate controls or positioning to shoot weapons while underway. Additionally, a locked inertial reel may cause the occupant to be chaffed, choked and/or bruised by the shoulder strap during rough or bouncy off road operation.

The lap inertial reel 13b preferably momentarily locks at between approximately 0.3 G and approximately 0.7 G, and more preferably at approximately 0.45 G to securely hold an occupant in the seat during rough off road operations. The reel 13b remains momentarily locked until the sensed acceleration drops below the calibration level. Additionally, the unlocking preferably requires that the Vehicle must be level plus or minus approximately 20 degrees (stays locked in roll over) and that the load on the retractor strap must be zero (occupant not applying load to the seatbelt). The reel 13b is preferably a latching reel which remains locked following a high sensed acceleration, until manually un-locked.

The reels 13a and 13b further preferably include fast retract springs to retract the belts quickly for rapid egress in a combat situation. The reels 13a and 13b preferably retract the belts 11a and 11b in less than approximately two seconds and more preferably retract the belts 11a and 11b in less than approximately one second. Such rapid retraction allows a soldier to quickly exit the vehicle without the belts catching on equipment or clothing. The mount 16 may be attached to the vehicle and are preferably attached to the vehicle floor or to the vehicle seat.

Figures 2A, 2B:
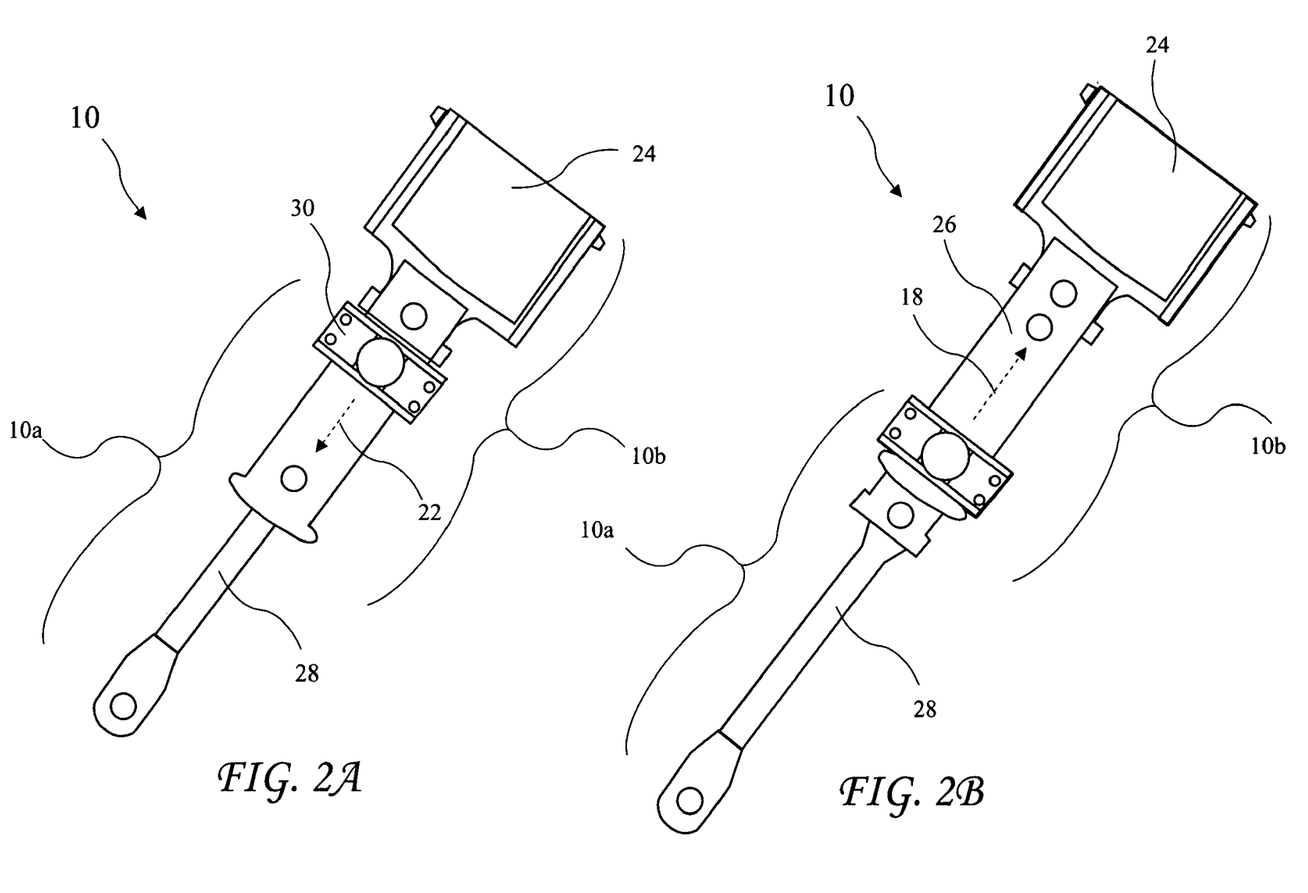
FIG. 2A is a detailed view of an adjustable buckle in the lowered position.
FIG. 2B is a detailed view of the adjustable buckle in the raised position.

A detailed view of the buckle adjuster 10 and buckle 24 is shown in the lowered position in FIG. 2A, and in the raised position in FIG. 2B. The buckle adjuster 10 includes a lower portion 10a which is attached to the mount 16 (see FIG. 1) and an upper portion 10b which extends and retracts with respect to the lower portion 10a. The buckle 24 is connected to the upper portion 10b. A latching mechanism 30 is fixedly attached to the lower portion 28 and cooperates with a slide 26 to adjust the position of the buckle 24. The buckle 24 may be retracted as shown by arrow 22 and may be extended as shown by arrow 18.

Figures 3, 4A, 4B, 4C, 5A, 5B, 5C, 5D, 6A, 6B, 6C, 7:
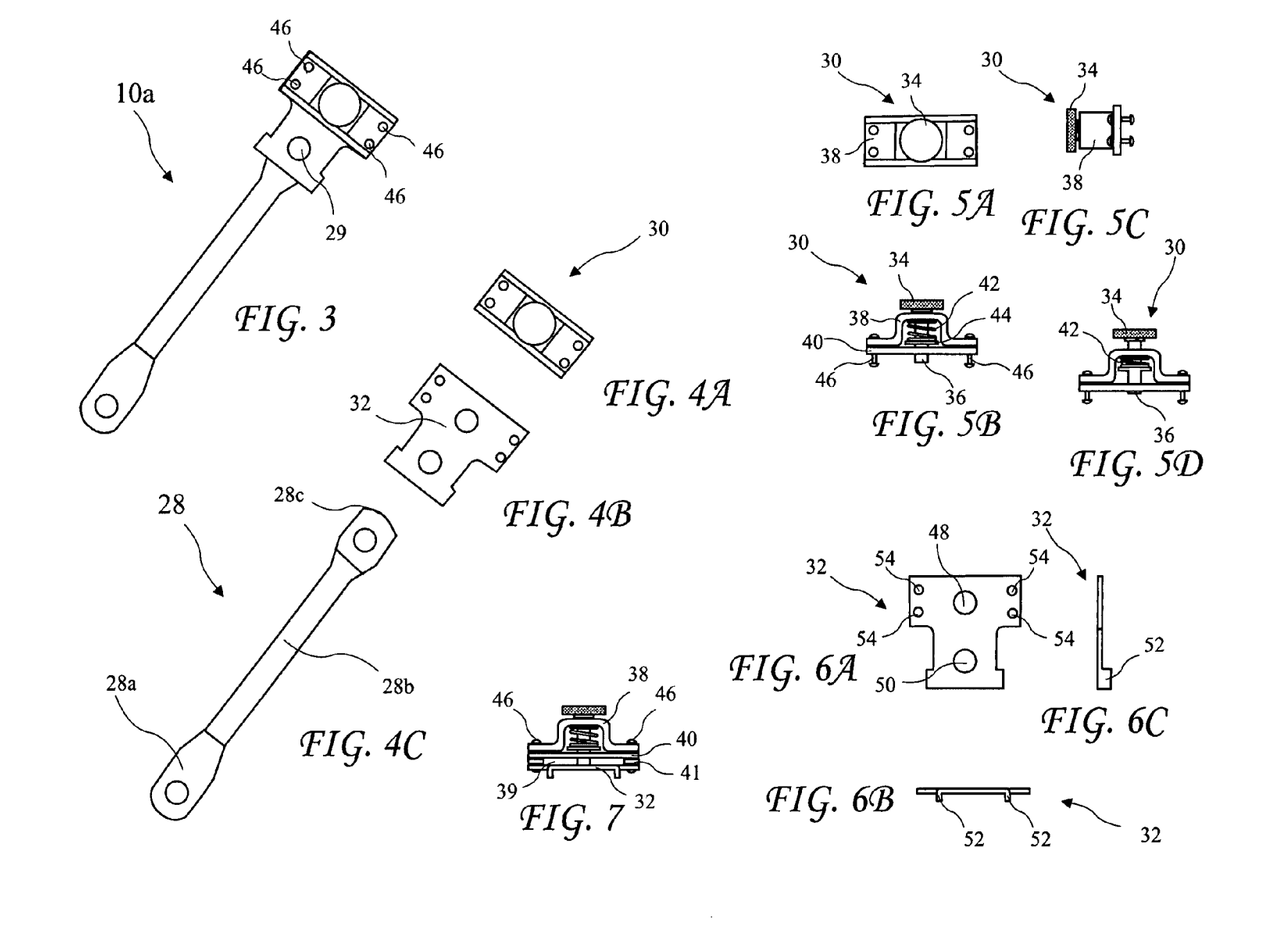
FIG. 3 is a lower portion of the buckle adjuster
FIG. 4A is a latching mechanism of the buckle adjuster.
FIG. 4B is a connecting plate of the buckle adjuster.
FIG. 4C is an arm of the buckle adjuster.
FIG. 5A is a detailed top view of the latching mechanism.
FIG. 5B is a detailed front view of the latching mechanism.
FIG. 5C is a detailed end view of the latching mechanism.
FIG. 5D is a view of the latching mechanism in an unlatched position.
FIG. 6A is a top view of the connecting plate.
FIG. 6B is a front view of the connecting plate.
FIG. 6C is an end view of the connecting plate.
FIG. 7 is the latching mechanism attached to the connecting plate.

The lower portion 10a of the buckle adjuster 10 is shown alone in FIG. 3. The lower portion 10a comprises the latching mechanism 30 shown in FIG. 4A, the connector plate 32 shown in FIG. 4B, and the arm 28 shown in FIG. 4C. The arm 28 has a mount end 28a, a body 28b, and a latch end 28c. The mount end 28a may rotate approximately 30 degrees in the mount 16 to allow angular (or front/rear) adjustment of the buckle 24. The body 28b is preferably a flexible body, and more preferably a heavy wire cable The connecting plate 32 is connected to the arm 28 by a rivet 29, and the latching mechanism 30 is connected to the connecting plate 32 by small rivets 46.

A detailed top view of the latching mechanism 30 is shown in FIG. 5A, a detailed front view of the latching mechanism 30 is shown in FIG. 5B, a detailed end view of the latching mechanism 30 is shown in FIG. 5C, and a view of the latching mechanism 30 in an unlatched position is shown in FIG. 5D. The latching mechanism 30 includes a top plate 38 and a base plate 40 forming a housing which contains a spring 42 biasing a pin 36 in a latched or inward position. The housing is preferably formed by a raised center portion of the top plate 38 and is preferably an open housing which is open on two sides to prevent or reduce material from becoming trapped in the housing. A knob 34 is attached to a knob end of the pin 36 for pulling the pin 36 to unlatch the latching mechanism 30 to allow the buckle 24 to be extended and to be retracted. The knob 34 is preferably an oversized knob and preferably a non slipping knob and more preferably a knurled knob. The knob 34 is thus easily used by a vehicle occupant wearing gloves, or with muddy slippery fingers. The pin 36 has an engaging end opposite the knob end for engaging adjusting pin holes 60 in the slide 26 (see FIG. 9B). The spring 42 resides over the pin 36 and inside the housing. A spring stop 44 on the pin 36 provides a seat for the spring 42 to bias the pin 36 inward.

A top view of the connecting plate 32 is shown in FIG. 6A, a front view of the connecting plate 32 is shown in FIG. 6B, and an end view of the connecting plate 32 is shown in FIG. 6C. The connecting plate 32 includes small holes 54 for the rivets 46 (see FIGS. 5B and 7), an adjusting pin hole 48, and a large rivet hole 50 for connecting the connector plate 32 to the arm 28. Two first lateral stops 52 reside on opposite sides of the arm 28 when the connector plate 32 is connected to the arm 28.

The latching mechanism 30 is shown attached to the connecting plate 32 in FIG. 7. The latching mechanism 30 preferably forms a guide 39, and more preferably, spacers 41 reside between the latching mechanism 30 and the connecting plate 32 to form the guide 39 for the slider 26 (see FIG. 8). The small rivets 46 pass through the top plate 38, the base plate 40, the spacers 41, and the connecting plate 32 to connect the top plate 38, base plate 40, spacers 41, and connecting plate 32 and to form the guide 39.

Figure 8:
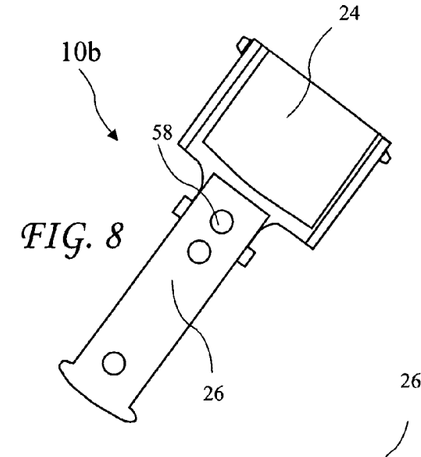
FIG. 8 is an upper portion of the buckle adjuster.
Figure 9B:
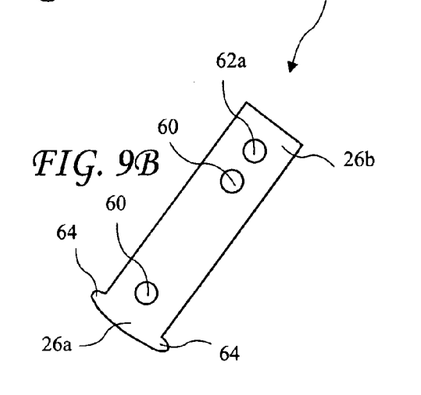
FIG. 9B is a slide of the buckle adjuster.

The upper portion 10b of the buckle adjuster 10 is shown alone in FIG. 8. The buckle 24 is shown with the connectors 72 in FIG. 9A, and the slider 26 alone is shown in FIG. 9B. The buckle 24 is connected to the slider 26 by a large rivet 58. The rivet 58 passes through the large rivet holes 62b in the buckle 24 and the large rivet hole 62a in the slider 26, thereby attaching the buckle 24 to the slider 26. The buckle 24 includes a release 67 pivotally attached to a buckle body 66 by a pin 68. The release 67 is larger than known buckle releases to allow a soldier wearing gloves and/or on a dark, smoky, or muddy environment, or with limited vision, to find and actuate the release 67. The buckle 24 preferably independently accepts the two connectors 72 which are inserted along arrows 74. The release 67 preferably rotates approximately 90 degrees before releasing the connectors 72 and actuation of a single release 67 releases both connectors 72, at which time the reels 13a and 13b quickly retract the belts 11a and 11b. The connectors 72 are preferably narrow and more preferably tapered toward the ends and preferably do not have edges or any similar feature which might snag on clothing, gear, arms, etc. The slider 26 includes a stop end with two opposing second lateral stops 64 and an adjusting pin hole 60, and a buckle end 26b with a large rivet hole 62a and a second adjusting pin hole 60.

Figure 10A:
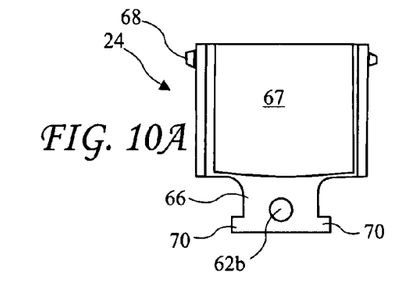
FIG. 10A is a top view of the buckle.
Figure 10B:
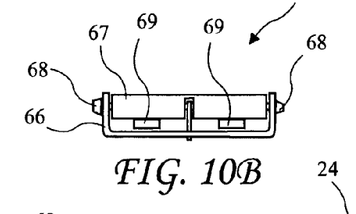
FIG. 10B is a front view of the buckle.
Figure 10C:
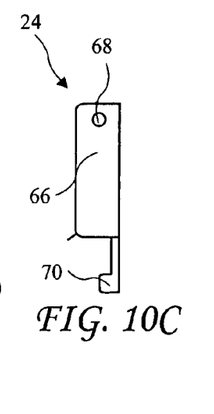
FIG. 10C is a side view of the buckle.

A top view of the buckle 24 is shown in FIG. 10A, a front view of the buckle 24 is shown in FIG. 10B, and a side view of the buckle 24 is shown in FIG. 10C. The buckle body 66 includes the large rivet hole 62b for connecting the buckle 24 to the slider 26 and third lateral stops 70 which reside on opposite sides of the buckle end 26b of the slider 26 when the slider is connected to the buckle 24 by the rivet 58. Connection latches 69 engage the connectors 72 to retain the belts 11a and 11b in the buckle 24 unless the release 67 is lifted. Each of the connection latches 69 are independently biased into a locked position wherein each of the connection latches 69 holds a respective one of the connectors 72, thus each connectors 72 may be independently inserted into the buckle 24 and caught (or retained) by one of the connection latches 69.

Figure 11:
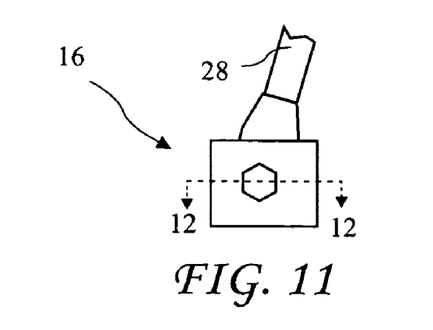
FIG. 11 is a detailed view of the buckle adjuster mount.
Figure 11A:
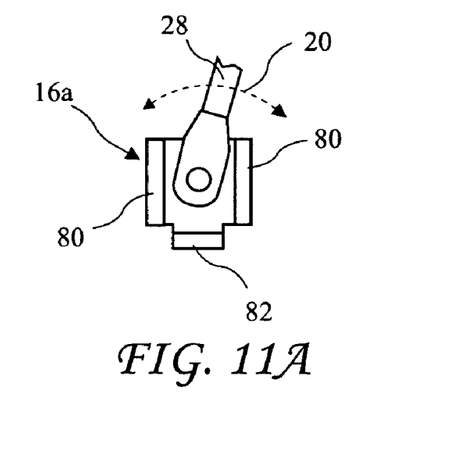
FIG. 11A shows the cooperation of the mount end of the arm with the mount.
Figure 12:
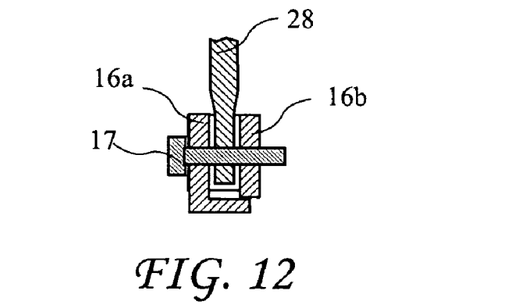
FIG. 12 is a cross-sectional view of the mount and mount end of the arm taken along line 12-12 of FIG. 11.
Figure 13A:
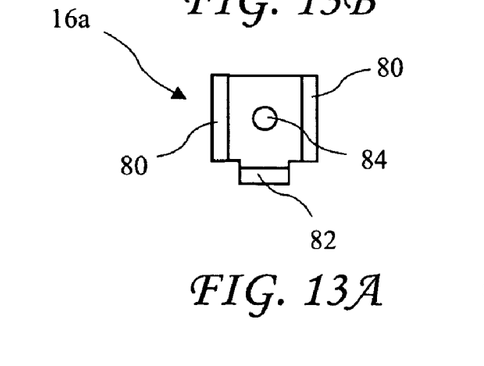
FIG. 13A is a front view of a cover piece of the mount.
Figure 13B:
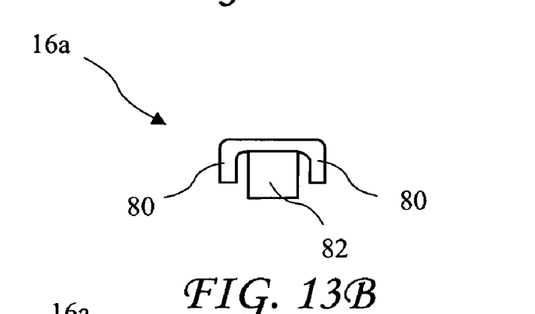
FIG. 13B is a top view of the cover piece of the mount.
Figure 13C:
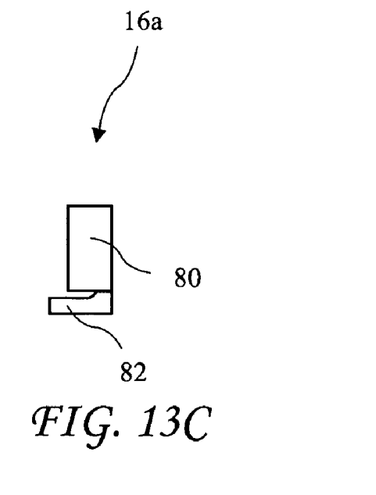
FIG. 13C is a side view of the cover piece of the mount.

A detailed view of the buckle adjuster mount 16 is shown in FIG. 11 and the cooperation of the mount end 28a of the arm 28 with a cover piece 16a of the mount 16 is shown in FIG. 11A. A cross-sectional view of the mount 16 and mount end 28a of the arm 28 taken along line 12-12 of FIG. 11 is shown in FIG. 12. A front view of the cover piece 16a of the mount 16 is shown in FIG. 13A, a top view of the cover piece 16a is shown in FIG. 13B, and a side view of the cover piece 16a is shown in FIG. 13C. The mount 16 comprises the cover piece 16a, a flat piece 16b, and a bolt 17. The cover piece 16a includes side flanges 80 which limit the rotation of the arm 28 along the arc 20, and which butt up against the flat piece 16b to form a pocket for the arm 16. The bolt 17 may engage threads in a vehicle to attach the mount 16.

When donning the restraint, if the buckle 24 requires adjustment due to body size or battle gear, such adjustment may be achieved by pulling and lifting the adjuster knob 34 until the buckle 24 is free to slide. When correctly adjusted, the knob 34 is then released and the buckle 24 position is fixed and may no longer move. This adjustment allows the buckle 24 to stay positioned to the occupant's hips as he moves forward relative to the seat back 12 due to any body-mounted equipment. Such relative positioning makes it easier for the occupant to don and doff the restraint and to find the buckle 34 in an egress situation.

While the buckle adjuster 10 is described herein as having two positions, a buckle according to the present invention may also have three or more positions. Further, the arm 28 may be connected to a vehicle using any type of mount. The buckle adjuster may also be used with a single shoulder belt 11a or a single lap belt 11b.

While the invention herein disclosed has been described by means of specific embodiments and applications thereof, numerous modifications and variations could be made thereto by those skilled in the art without departing from the scope of the invention set forth in the claims.

We claim:
1. A restraint system comprising:
a shoulder inertial reel;
a shoulder belt extendable from the shoulder inertial reel and having a shoulder connector;
a lap inertial reel;
a lap belt extendable from the lap inertial reel and having a lap belt connector;
a buckle mount connected to a vehicle;
a buckle adjuster connected to the buckle mount, the buckle adjuster comprising:

an arm having a mount end and a latch end, the mount end attached to the buckle mount;

a latching mechanism fixedly attached to the latch end of the arm; and a longitudinal slide having a stop end and a buckle end and at least two longitudinally spaced apart latching features for cooperation with the latching mechanism to latch the slide in one of at least two longitudinal positions; and a buckle connected to the buckle end of the longitudinal slide and receiving the belts wherein the latching mechanism forms a guide;

the longitudinal slide slides longitudinally through the guide;

wherein the latching mechanism further comprises:
- a housing;
- a pin extending through the housing and having an engaging end aligned to engage the latching features and a knob end opposite the engaging end;
- a spring residing in the housing and biasing the pin in an inward direction to engage one of the latching features; and
- a knob attached to the knob end of the pin, the knob biased toward the housing by the spring.

2. The buckle adjuster of claim 1, wherein the housing is an open housing.

3. The buckle adjuster of claim 2, wherein:

the housing includes a top plate and a base plate;

the spring resides between the base plate and the top plate; and the pin extends through the base plate to engage the latching features.

4. The restraint system of claim 3, wherein:

the latching mechanism resides above a top surface of the longitudinal slide;

a connecting plate resides opposite the latching mechanism below a bottom surface of the longitudinal slide;

spacers reside between the latching mechanism and the connecting plate defining the guide; and the connecting plate connects the latching mechanism to the latch end of the arm.

5. The restraint system of claim 4, wherein:

the connecting plate includes a pin passage; and in a latched position, the pin passes through the base plate, through the longitudinal slide and at least partially through the connecting plate.

6. A restraint system comprising:

a shoulder inertial reel;

a shoulder belt extendable from the shoulder inertial reel and having a shoulder belt connector;

a lap inertial reel;

a lap belt extendable from the lap inertial reel and having a lap belt connector;

a buckle mount connected to a vehicle;

a buckle adjuster connected to the buckle mount, the buckle adjuster comprising:

an arm having a mount end and a latch end, the mount end attached to the mount;

a connecting plate attached to the latch end of the arm;

a latching mechanism attached to the connecting plate and including a pin biased toward the connecting plate;

a guide formed between the connecting plate and the latching mechanism; and a longitudinal slide having a stop end and a buckle end and at least two longitudinally spaced apart latching features for cooperation with the pin to latch the longitudinal slide in one of at least two longitudinal positions; and a buckle attached to the buckle end of the longitudinal slide.

* * * * *